(12) United States Patent
Blöcher et al.

(10) Patent No.: US 11,223,657 B2
(45) Date of Patent: Jan. 11, 2022

(54) ONE-WAY COUPLING DEVICE, REQUEST APPARATUS AND METHOD FOR FEEDBACK-FREE TRANSMISSION OF DATA

(71) Applicant: Siemens Aktiengesellschaft, Munich (DE)

(72) Inventors: Uwe Blöcher, Puchheim (DE); Rainer Falk, Poing (DE); Jens Reinert, Wolfenbüttel (DE); Wen Tang, Beijing (CN); Martin Wimmer, Neubiberg (DE)

(73) Assignee: SIEMENS AKTIENGESELLSCHAFT

( * ) Notice: Subject to any disclaimer, the term of this patent is extended or adjusted under 35 U.S.C. 154(b) by 61 days.

(21) Appl. No.: 15/559,524

(22) PCT Filed: Mar. 18, 2016

(86) PCT No.: PCT/EP2016/055915
§ 371 (c)(1),
(2) Date: Sep. 19, 2017

(87) PCT Pub. No.: WO2016/156063
PCT Pub. Date: Oct. 6, 2016

(65) Prior Publication Data
US 2018/0124121 A1    May 3, 2018

(30) Foreign Application Priority Data
Mar. 31, 2015    (DE) .................. 10 2015 205 833

(51) Int. Cl.
*H04L 29/06*    (2006.01)
*H04W 12/03*    (2021.01)
(Continued)

(52) U.S. Cl.
CPC ........ *H04L 63/306* (2013.01); *G06F 21/6236* (2013.01); *H04L 63/02* (2013.01);
(Continued)

(58) Field of Classification Search
CPC ... H04L 63/306; H04L 63/0281; H04L 63/02; H04L 63/105; H04L 63/0209;
(Continued)

(56) References Cited

U.S. PATENT DOCUMENTS 7,656,885 B2*  2/2010  Tam ..................... H04L 67/28
                                                       370/401
7,675,867 B1   3/2010  Mraz et al.
(Continued)

FOREIGN PATENT DOCUMENTS

CN    101382982 A    3/2009
CN    102609645 A    7/2012
(Continued)

OTHER PUBLICATIONS

Zhuang et al., "CoShare: A Cost-Effective Data Sharing System for Data Center Networks," 2015 IEEE Conference on Collaboration and Internet Computing (CIC) Year: 2015 | Conference Paper | Publisher: IEEE.*
(Continued)

*Primary Examiner* — Roderick Tolentino
(74) *Attorney, Agent, or Firm* — Schmeiser, Olsen & Watts LLP.

(57) ABSTRACT

A one-way coupling device for the feedback-free transmission of data from the first network with high security requirements into a second network with low security requirements, containing a request unit, an eavesdropping unit and a receiving unit, wherein the request unit is formed so as to provide a first communication link within the first network to at least one device and, moreover, to request first
(Continued)

data from the at least one device and then to transmit the first data via a second communication link on a separate line loop of the request unit, and the eavesdropping unit, which is formed so as to eavesdrop on data on the separate line loop and to transmit data to a receiving unit which is arranged in the second network. Also, a corresponding request unit, a corresponding method and a corresponding computer program product is also provided.

14 Claims, 2 Drawing Sheets

(51) Int. Cl.
*G06F 21/62* (2013.01)
*H04W 12/02* (2009.01)

(52) U.S. Cl.
CPC ........ *H04L 63/0281* (2013.01); *H04L 63/105* (2013.01); *H04W 12/02* (2013.01); *H04W 12/03* (2021.01); *H04L 63/0209* (2013.01); *H04L 63/123* (2013.01)

(58) Field of Classification Search
CPC .............. H04L 63/123; H04L 43/0858; H04L 63/1425; H04L 43/10; H04L 43/16; G06F 21/6236; H04W 12/03; H04W 12/02; H04W 24/00; H04Q 2209/60
See application file for complete search history.

(56) References Cited

U.S. PATENT DOCUMENTS

| | | | |
|---|---|---|---|
| 2003/0202663 A1 | 10/2003 | Engelbach et al. | |
| 2005/0033990 A1 | 2/2005 | Harvey et al. | |
| 2008/0036629 A1* | 2/2008 | Dawra .................... | G06F 16/88 341/50 |
| 2008/0152139 A1* | 6/2008 | Klassen .............. | H04W 12/033 380/247 |
| 2010/0162399 A1 | 6/2010 | Sheleheda et al. | |
| 2011/0206054 A1* | 8/2011 | Pajjuri .................. | H04W 36/14 370/401 |
| 2012/0291089 A1 | 11/2012 | Bomgardner et al. | |
| 2013/0046990 A1* | 2/2013 | Fahrny .................. | H04L 9/3247 713/176 |
| 2013/0081130 A1* | 3/2013 | Huba .................. | H04L 63/0236 726/11 |
| 2014/0040657 A1 | 2/2014 | Kiessling et al. | |
| 2014/0208390 A1* | 7/2014 | Brown .................... | G05B 11/01 726/4 |
| 2014/0237561 A1 | 8/2014 | Mraz | |
| 2015/0016256 A1 | 1/2015 | Skog et al. | |
| 2015/0067104 A1* | 3/2015 | Curry .................. | H04L 63/0209 709/218 |
| 2015/0215075 A1* | 7/2015 | Baek ....................... | H04L 63/18 726/4 |
| 2015/0358323 A1* | 12/2015 | Mraz ..................... | H04L 63/123 726/4 |

FOREIGN PATENT DOCUMENTS

| | | |
|---|---|---|
| CN | 103684716 A | 3/2014 |
| CN | 104363221 A | 2/2015 |
| KR | 101334240 B1 | 11/2013 |
| WO | WO 2014029958 A1 | 2/2014 |
| WO | WO 2015020985 A1 | 2/2015 |

OTHER PUBLICATIONS

Bandhu et al., "Performance analysis of TCP Linux in WiMAX network with network asymmetry," 2015 International Conference on Computer, Communication and Control (IC4) Year: 2015 | Conference Paper | Publisher: IEEE.*
PCT International Search Report PCT International Application No. PCT/EP2016/055915, dated Jun. 6, 2016.
Jin Tang, Master Thesis Submitted to University of Electronic Science and Technology of China, Oct. 9, 2012; 2012; 20 pages.
Office Action in corresponding Chinese Application No. 201680019887.6, dated Nov. 25, 2019. 5 pages.

* cited by examiner

ONE-WAY COUPLING DEVICE, REQUEST APPARATUS AND METHOD FOR FEEDBACK-FREE TRANSMISSION OF DATA

CROSS-REFERENCE TO RELATED APPLICATIONS

This application claims priority to PCT Application No. PCT/EP2016/055915, having a filing date of Mar. 18, 2016, based off of German application No. DE 102015205833.6 having a filing date of Mar. 31, 2015, the entire contents of which are hereby incorporated by reference.

FIELD OF TECHNOLOGY

The following relates to a one-way coupling device, a request apparatus, a method and a computer program product for feedback-free transmission of data from at least one device, which is arranged in a first network with high security requirements, into a second network with relatively low security requirements.

BACKGROUND

Security solutions for the transfer of data between networks with different security requirements, referred to as cross-domain security solutions have until now been used only for specific areas such as communications between authorities in which high security requirements apply and in which there is a security classification of documents or information. A cross-domain solution implements automated secure exchange of documents and messages, such as for example also E-mails, between varyingly high security zones. In this context, a decisive requirement is that data is only transmitted from the zone with relatively high security requirements into a zone with relatively low security requirements, and in the process, during the transmission new data cannot be newly introduced into the network with relatively high security requirements and data within the network with relatively high security requirements cannot be changed by the exchange. A significant component here is a data diode which ensures the unidirectionality of the data communication.

US 2012/291089 discloses, for example, a solution for the secure exchange of data between two security areas. In this context, a data management unit is connected both to the first and to the second security zones, said unit taking into account the security rules of both domains.

Data diodes are also known which physically implement a one-way communication. In order to assist a data transmission with bidirectional data transmission protocols, such as, for example, TCP, it is known either to permit an extremely limited back channel for the transmission of confirmation messages, or alternatively in U.S. Pat. No. 7,675,867 the protocol is terminated at a proxy and transmitted, for example by means of forward error correction, via the unidirectional transmission path.

In order to ensure feedback-free exchange of data from a security-critical control network, for example a railway protection network, into a less critical network, such as for example a diagnostic network or an office network, it is often also necessary to take into account international standards, such as for example, the ISO/IEC 62443 which defines strict technical security requirements with respect to the exchange of data between security zones.

SUMMARY

An aspect relates to making available methods and devices for a corresponding data transmission, which methods and devices ensure, on the one hand, the freedom from feedback of the data transmission and, on the other hand, are easy to implement. Furthermore, such a device or such a method is to be capable of being used in a flexible way in various fields of application.

The one-way coupling device according to embodiments of the invention for feedback-free transmission of data from at least one device which is arranged in a network with high security requirements into a second network with relatively low security requirements contains a request apparatus, a monitoring apparatus and a receiver apparatus. The request apparatus is designed to make available a first communication connection within the first network to the at least one device and to request first data from the at least one device via said communication connection, and subsequently to transmit the first data via a second communication connection on a separate loop line between two interfaces of the request apparatus. The monitoring apparatus is designed to monitor data on the external second communication connection and to transfer it to the receiver apparatus which is arranged in the second network.

A monitoring apparatus is to be understood here as being an apparatus which copies a data stream which is transmitted via the monitored connecting line, and outputs the copy of the data stream. In this context, in particular no evaluation, content processing or conversion of the data of the data stream takes place. The data is output via the receiver device which is connected to a second network.

This has the advantage that the freedom from feedback is ensured. On the other hand, data which is desired can be requested via the communication connection between the request apparatus and one or more devices in the first network and can be made available to the second network via the monitoring apparatus and the receiver apparatus. In this context, the first communication connection extends exclusively within the first network and is terminated in the at least one device and the request apparatus.

In one advantageous development of embodiments of the invention the request apparatus has a first protocol unit for scheduling at least one communication protocol of the first communication connection to the at least one device. In particular, it has scheduling of the OPC UA protocol frequently used in security networks.

This has the advantage that the first data is present in the request unit in a form which can be read directly, i.e. without further protocol information or even encryption. This facilitates the evaluation and further processing of such data in the receiver apparatus or in further evaluation units of the second network. Different, even complex, protocols for the communication connection can be used in an unchanged manner for the requesting process. In particular, the Uniform Architecture protocol of the OPC organization, referred to for short as OPC UA protocol, is used for security systems. In this context, the communication connection or the corresponding data transmission can also be secured in a cryptographic fashion. Since the connection is terminated in the request apparatus, cryptographic methods and keys which are negotiated for example in the connection setup between the communication partners are also known in the protocol unit. First data which is transmitted in encrypted form is therefore decoded in the first protocol unit of the request apparatus and can therefore be transmitted in unencrypted form to the second network via the second communication connection.

In a further exemplary embodiment, the request apparatus has a second protocol unit for making available a second communication protocol for the transmission of the first data via the connecting loop.

This has the advantage that the first data is already structured and transmitted by the request apparatus according to a second protocol which is present, for example, in the receiver apparatus. The receiver apparatus therefore does not require any protocol conversion and can be made less complex. It is therefore possible, in particular, for a data transmission which can easily be evaluated to take place. Different protocols for the first communication connection and a uniform transmission via the second communication connection can therefore be used in a flexible way. On the other hand, the second communication connection can correspond to the protocol which is supported in the receiver apparatus.

In one advantageous embodiment, the request apparatus has a conversion unit for converting the format of the first data.

In a further advantageous embodiment, the request apparatus has a memory unit for storing the first data.

This permits the first data to be transmitted via the second communication connection in a data format which is favorable for the receiver unit in the second network, and to be stored, for example, in a database in accordance with a data format which is used. Thus it is sufficient if the receiver apparatus only supports one specific data format for the reception and the further processing of the first data.

In one advantageous embodiment, the monitoring apparatus is embodied as a data copier, in particular as a network tap.

This has the advantage that the unidirectionality of the data transmission is ensured, since data can only be copied from the second communication connection, but data cannot be introduced into the second communication connection or indirectly into the first communication connection from the second network. This ensures at the same time the freedom from feedback since no change occurs to the first data transmitted on the second communication connection and no change occurs to data transmitted on the first communication connection. Also, no additional new data can be introduced into the first communication connection or second communication connection. At the same time, this is a method which is easy to implement.

The one-way coupling device therefore implements three-stage protection of the feedback-free data transmission. The first stage forms the closed communication connection in the security-critical first network. The second stage forms the second communication connection. The latter is physically separated from the first communication connection and other network transmission paths in the first network. The inputting of interference from messages from the second communication connection to the first communication connection is therefore ruled out or at least minimized. The influencing of transmission quality parameters of a data transmission in the first network, such as for example delay times for a channel access operation, is also avoided. In general, the request unit is arranged in a spatially protected and/or enclosed area, for example a switching cabinet. Tampering with the second communication connection is therefore made more difficult. The third stage forms the monitoring apparatus which is embodied as a network tap or data copier and which produces an unchanged copy of the first data and permits transmission into the second network with decoupling from the first network. Inputting of interference from messages into the connection loop by the monitoring unit is therefore not possible and not provided.

If the one-way coupling device according to embodiments of the invention is not implemented in an enclosed area, for example within a switching cabinet or within a network rack, the first data can be transmitted in a cryptographically secured fashion via the second communication connection, with the result that monitoring of the first data is made more difficult or is not possible.

A request unit according to embodiments of the invention for feedback-free transmission of first data from at least one device in a first network is designed to make available a first communication connection within the first network to at least one device, and to request first data from the at least one device via said first communication connection and subsequently to transmit the first data via a second communication connection on a separate line loop from an output interface of the request apparatus directly to an input interface of the request apparatus.

This has the advantage that the request apparatus is completely integrated into the first network and serves to request or else collect information from the devices within the first network. It is therefore possible to determine first data, such as for example status information of safety systems within the highly protected railway control network. On the other hand, a simple and feedback-free transmission into a second network with relatively low security requirements is possible via the separate second communication connection. In this context, the first and second communication connections are disconnected from one another and therefore already form, within the first network, a means of completely decoupling from said first network. This decoupling is also a basis for flexible use of the request apparatus in secured networks with different first communication protocols.

The method according to embodiments of the invention for feedback-free transmission of data from at least one device which is arranged in a first network with high security requirements into a second network with low security requirements has the following method steps.

Making available a first communication connection within the first network, requesting and receiving first data from at least one device via the communication connection, transmitting the first data via a separate second communication connection, monitoring the first data at the second communication connection, and transferring the first data to a second network with low security requirements.

The method according to embodiments of the invention transmits first data from a security-relevant network without feedback into a second network with relatively low security requirements. This is implemented in a particularly flexible and simple way by virtue of the separation of the data transmission via the first communication connection and a separate second communication connection within the first network. Furthermore, the monitoring ensures reliable transmission in only one direction, specifically from the first network to the second network.

In one advantageous exemplary embodiment, a first communication protocol is used for the communication connection to the at least one device, in particular the OPC UA protocol, and/or a second communication protocol is used for transmitting the first data via the second communication connection.

Different protocols on the two communication connections permit flexible use of the method in different application areas or security and automation networks. Furthermore, for example in order to simplify the evaluation in a second network it is possible to use an identical second communication protocol. The first data is therefore converted from a first communication protocol to a second communication protocol.

In one advantageous embodiment, the format of the first data is converted in a request apparatus and/or the first data is stored in a memory unit.

This permits flexible handling of the first data, in particular the first data can already be converted in the first network into a data format which is favorable for the evaluation in the second network. The storage of the data permits the data to be collected and only temporary transmission of the first data into the second network. A second data connection and means for monitoring therefore do not have to be continuously present.

In one advantageous embodiment, the first data is transmitted in encrypted form on the communication connection and is decrypted before the transmission on the second communication connection.

This has the advantage that first data which is transmitted in encrypted form in the first communication network can also be used for evaluation in the second network.

In one advantageous embodiment, the data is transmitted in unencrypted form on the second communication connection.

The request apparatus therefore does not have to make available any encryption means for the second communication device and, in particular, the receiver apparatus. Therefore, it is possible to use fewer complex request apparatuses or receiver apparatuses.

In one alternative embodiment variant, the data for transmission on the second communication connection is encrypted with a predetermined cryptographic method.

This additionally protects the data transmission against unauthorized monitoring or tampering with the data transmission, in particular if such a one-way coupling device is not arranged in a protected area, such as for example within a switching cabinet or within a network rack, but instead is arranged in such a way that it is accessible from the outside.

In particular, in this context a specific encryption method between the request apparatus and the receiver apparatus can be agreed and this specific encryption method can always be used for the transmission via the second communication connection.

In one advantageous embodiment, the data is stored in an evaluation database in the second network and passed on to an evaluation apparatus on request or automatically.

This has the advantage that an active connection between the receiver unit and an evaluation apparatus has to be made available only temporarily. The data which is received from the first network can also be evaluated at desired monitoring intervals.

A computer program product (non-transitory computer readable storage medium having instructions, which when executed by a processor, perform actions) according to embodiments of the invention is claimed which can be loaded directly into a memory of a digital computer and comprises program code parts which are suitable for carrying out the steps of the method.

BRIEF DESCRIPTION

Some of the embodiments will be described in detail; with reference to the following figure, wherein like designations denote like members, wherein.

Corresponding parts are provided with the same reference symbols in all the figures.

DETAILED DESCRIPTION

Figure 1:
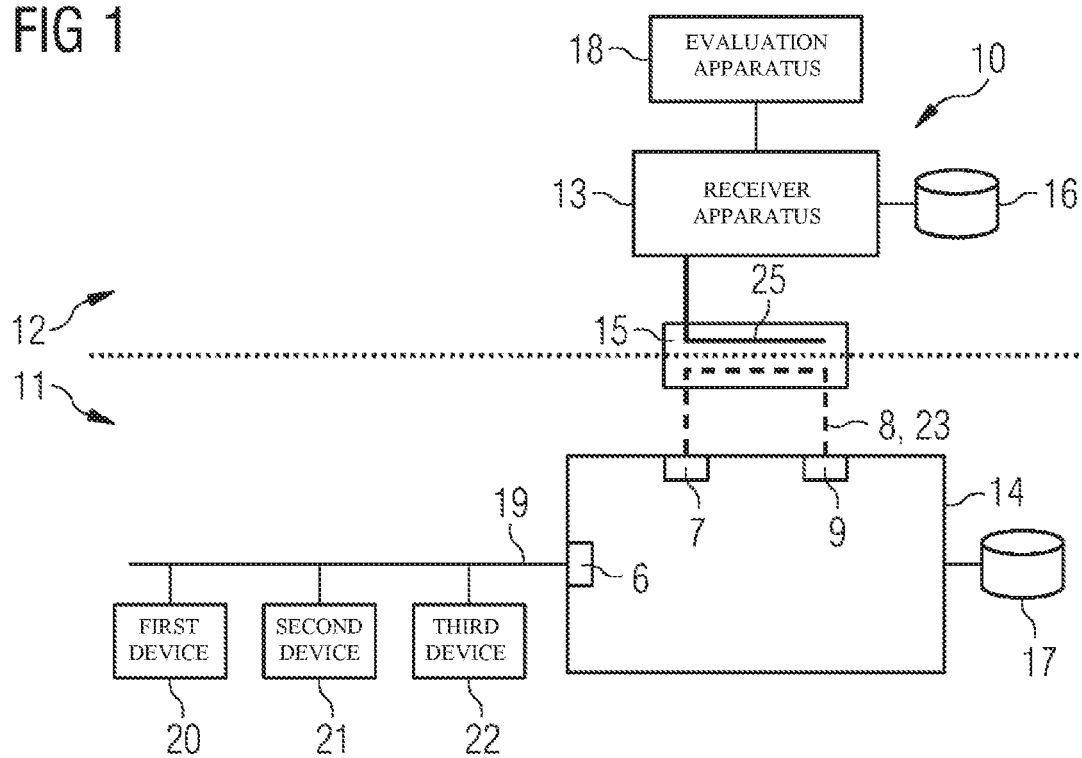
FIG. 1 shows an exemplary embodiment of a one-way coupling device arranged at the coupling point between a first and a second network in a schematic illustration.

FIG. 1 shows an application case for a one-way coupling device, for example from the field of railway automation. Similar application scenarios also occur in vehicle control technology, in energy automation, in fabrication automation or in process automation. In a first network with high security requirements, devices 20, 21, 22, such as for example control computers with field devices, are connected via a first communication connection 19 to a request apparatus 14 and transmit information to a request apparatus 14. In the application case, for example status information of the devices 20, 21, 22 is then to be transferred to a diagnostic/monitoring system, represented in FIG. 1 by the evaluation apparatus 18. The evaluation apparatus 18 is integrated into a second network 12 with low security requirements, such as for example an office network or a public network. Owing to technical security criteria it must be ensured that a directed one-way communication is implemented, which prevents potentially damaging data, such as for example viruses, from passing from the second network with low security requirements 12 into the first network 11 which is critical in terms of security. The communication within the first network can occur, for example, via an OPC UA protocol, which is frequently used in railway automation networks.

Feedback-free transmission of data is understood to be unidirectional one-way communication which prevents potentially damaging data from passing from the second network into the first network 11 which is critical in terms of security. An optimal feedback-free transmission is provided if no data whatsoever are introduced from the second network 12 into the first network 11, and also no data are introduced into the first network 11 through a coupling device.

The illustrated one-way coupling device 10 realizes such a feedback-free transmission of data and comprises a request apparatus 14, a monitoring apparatus 15 and a receiver apparatus 13. For this purpose, a request apparatus 14 is arranged in the first network 11, which request apparatus 14 makes available first communication connections 19 to devices 20, 21, 22. The making available of the first communication connections 19 comprises the connection setup over all the protocol layers corresponding to an OSI protocol stack of the communication protocol which is used in the first network 11. This includes, for example, mutual authentication of the devices 20, 21, 22 and of the request apparatus 14 and a cryptographically protected transmission of the transmitted first data. In this context, for example in order to carry out secure transmission, the data is transmitted in encrypted form via the communication connection.

The request apparatus has for this purpose a network interface 6 at which the communication connection is terminated. The request unit 14 is designed to request first data from the devices 20, 21, 22. For example the OPC UA protocol is used for this communication. Since the communication connection according to the communication protocol is completely terminated in the request apparatus 14, the first data is then present there in a decrypted and therefore interpretable form.

Figure 2:
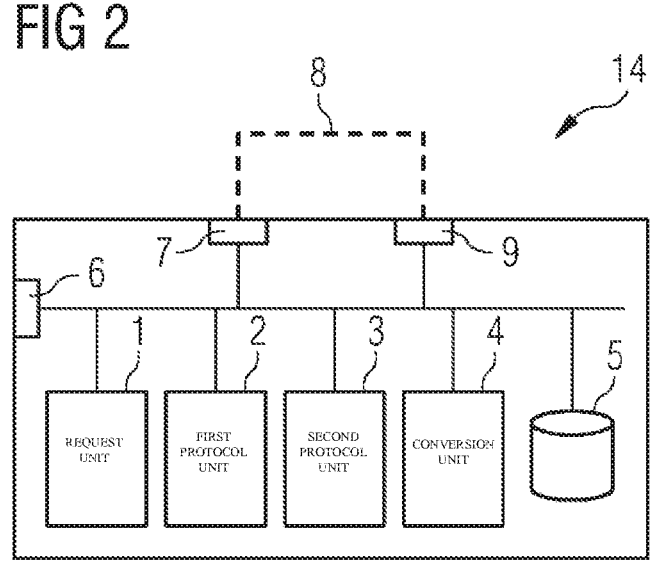
FIG. 2 shows an exemplary embodiment of a request apparatus in a schematic illustration.

As illustrated in FIG. 2, the request apparatus 14 comprises, in addition to the network interface 6, a request unit 1 which comprises information about the data to be determined from the desired devices, such as for example the time of the request and type of the desired data. In a first protocol unit 2, all the means for setting up the first communication connection 19 within the first network 11 are made available. A second protocol unit 3 comprises all the means for setting up a second communication connection 23, different from the first communication connection 19, via a separate line loop 8. A conversion unit 4 makes available means for transferring the data format of the first data, which has been input via the first communication connection 19, into another predefined format in which the first data is then stored in a memory unit 5 and/or transmitted via the second communication connection 23. The separate loop connection 8 is formed between an output interface 7 and an input interface 9 of the request unit 14. The loop connection 8 can be embodied externally, that is to say can run outside the request apparatus 14. The loop connection 8 can, however, also be embodied within the request apparatus 14, in particular if it is embodied as a combined apparatus integrated with a monitoring unit 15. The loop connection 8 therefore starts and ends directly at the request apparatus 14 without further units or components being passed through by the loop connection 8. The loop connection is formed here via an output interface 7 and an input interface 9 of the request unit 14, which output interface 7 and input interface 9 do not coincide with the network interface 6. The first data can optionally be stored in a request database 17 which can be embodied as an integral component or as a connected external database.

Furthermore, the one-way coupling device 10 comprises, as illustrated in FIG. 1, a monitoring apparatus 15 with a coupling unit 10 which is embodied, for example, as a network tap or a data copier. In this context, for example the data stream is duplicated and passed on to a receiver unit 13 via a separate connection, while the original data stream flows unchanged in the loop connection 8 to the request apparatus 14. This monitoring apparatus represents the direct connecting point between the first network 11 and the second network 12. Since only copying of data from the second communication connection but not introduction of data into the second communication connection 23 is possible by means of the coupling unit 10, the one-way communication is provided starting from the first, security-relevant network 11 to the less security-relevant second network 12.

Such data copiers or network taps are known from network monitoring systems or else from penetration detection systems and therefore constitute a simple and reliable unidirectional data transmission means. An evaluation database 17 in which the monitored or copied first data is stored can optionally be connected to the receiver unit 13. The evaluation database 17 can also be embodied as an integral component of the receiver apparatus.

The first data which is received in the receiver apparatus 13 can either be transmitted to the evaluation apparatus 18 by means of a push mechanism, that is to say by active passing on in the sense of a publish-and-subscribe approach, or in the case of buffering in the evaluation database 16 can, by means of a pull mechanism by the evaluation apparatus 18, be actively requested from the receiver apparatus 13 or the evaluation database 16.

In a similar way, the first data which is requested by the request unit 14 in the first network 11 can be buffered in a request database 17 and transmitted, for example at regular intervals or at predefined time intervals, via the second communication connection 8.

The described one-way coupling device 10 represents a cost-effective implementation through the use of the monitoring apparatus 15 instead of specific one-way connections through data diodes. As a result of the separation of the first communication connection 19 and of the second communication connection 23 with respect to the protocols and data presentation used, the one-way coupling device 10 can be used in a flexible way for different application areas and application protocols. The transfer of the first data via, for example, the network tap occur by means of a protocol which is as simple as possible. Relatively complex protocols, such as for example OPC UA, are limited to the first communication connection 19 and are terminated in the request apparatus 14, in particular in the first protocol unit 2. The first data can be stored, for example, in the form of an XML document. This makes the solution scaleable with respect to its use for further application areas and the use of different protocols in the surrounding networks.

A further advantage is the independence from encrypted communication, in particular within the first network 11. If the communication occurs in the first network and/or in the second network 12 using security protocols, such as for example SSL/TLS, key information for the decryption of the communication must be present at the coupling point, see the dashed line in FIG. 1, if the network tap is provided directly in the first network 11. In the described solution approach, an encrypted communication is supported. The encryption in the first network 11 is terminated at the request apparatus 14. The transmission via the second communication connection 23 occurs in an unencrypted form or can in turn be transmitted in an encrypted form by means of encryption which can be agreed between the request apparatus 14 and the receiver apparatus 13.

Figure 3:
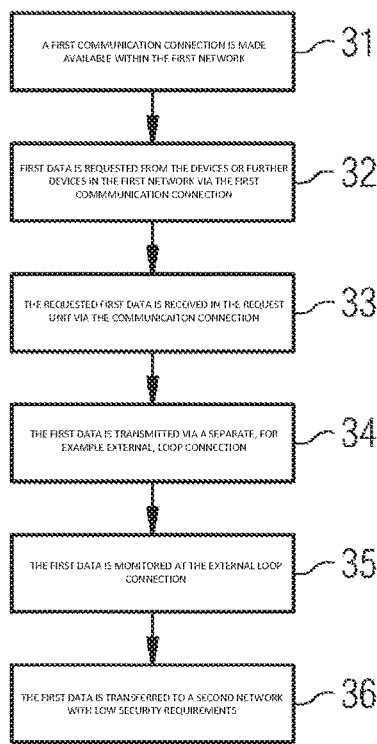
FIG. 3 shows an exemplary embodiment of the method in the form of a flow chart.

FIG. 3 illustrates the individual method steps of the method according to embodiments of the invention. In the first method step 31, a first communication connection 19 is made available within the first network 11. In the method step 32, first data is requested from the devices 20, 21, 22 or further devices in the first network 11 via the first communication connection. For this purpose, a request apparatus 14 can contain predefined request profiles. In the method step 33, the requested first data is received in the request unit 14 via the communication connection 19. In this context, the first communication connection 19 is terminated in accordance with the communication protocol which is used, and in particular authentication of the devices 20, 21, 22 or of the request apparatus 14 is carried out and first data which has been transmitted in encrypted form is decrypted again.

In the method step 34, the first data is transmitted via a separate, for example external, loop connection 8. Although the loop connection 8 is located within the vicinity of the network 11, it is physically separated from the first communication connection 19. In the method step 35, the first data is monitored at the external loop connection 8, and in the method step 36 it is transferred to a second network 12 with low security requirements 12.

Figure 4:
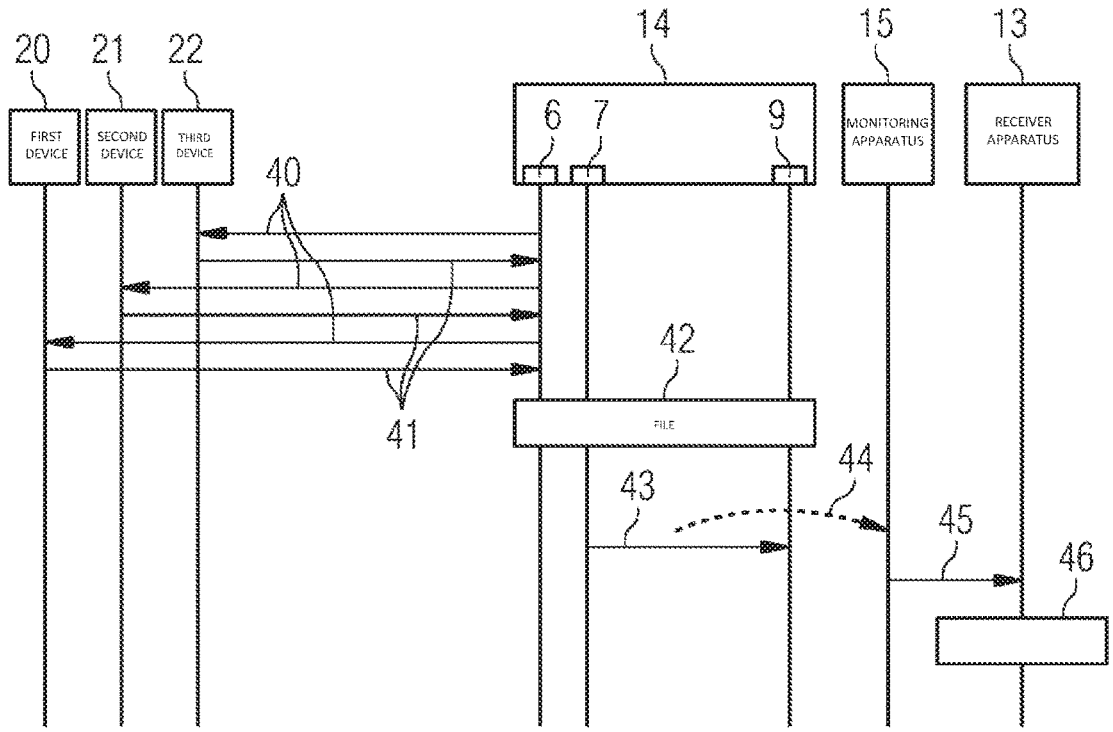
FIG. 4 shows an exemplary embodiment of the method by means of a one-way coupling device in the form of a message flow diagram.

FIG. 4 then shows the method on the basis of a security network in a railway protection system with security devices 20, 21, 22. In each case a first communication connection 19, which terminates in the request apparatus 14 at the network interface 6, is made available between the individual devices 20, 21, 22 and the request apparatus 14. The request apparatus 14 represents here an OPC UA client. Request messages 40 are transmitted to the devices 20, 21, 22 via the first communication connection 19, and the requested first data is sent back to the request apparatus 14 in response messages 41. The first data which is contained in the response messages 41 is extracted by the first protocol unit 2 and converted into another form (for example into an Extensible Markup Language, referred to as XML for short). The first data is structured in accordance with a second communication protocol of the second communication connection 23 by means of the second protocol unit 3 and output via the output interface 7 for transmission via the loop connection 8, and received again at the input interface 9, see arrow 43. The communication connection is copied by the monitoring apparatus 15, see dashed arrow 44, and transferred to the receiver unit 13, see arrow 45, on the loop connection 8 between an output interface 7 and an input interface 9. The physical property of the network tap ensures that this takes place without feedback, i.e. no flow of information in the reverse direction from the second network into the first network 11 is possible.

The receiver apparatus 13 functions, for example, as an OPC UA server. The receiver apparatus 13 can, however, also support a relatively simple protocol and process the message 43 which has been transmitted, or message 45 which has been passed on, in the corresponding protocol on the second communication connection 23. A request to an evaluation apparatus 18 can then be responded to on the basis of the first data stored in the evaluation database or in the receiver apparatus 13.

A significant advantage of this structure is that the one-way coupling device can be integrated into existing control networks without the need for the existing components to be changed or adapted. In this context, the one-way coupling device can be embodied as a physically separate request apparatus 14, monitoring apparatus 15 and receiver apparatus 13 or as a single integrated device.

The receiver apparatus 13 acquires the diagnostic data from the devices 20, 21, 22. This can be done e.g. by means of OPC UA, Telnet, SNMP, FTP, SCP, http or the like. For example, the request unit 14 can request first data from the devices in a cyclical fashion e.g. with triggering by an internal timer, and can collect said data in the request database 17 of the request unit 14. It is also possible to form a file 42 which contains the data values which have been changed, in particular converted into a different format. This file 42 is transmitted by the request unit 13 between two network interfaces 7, 9 of the request unit 14, e.g. via FTP or http. That is to say that the request unit 14 transmits the file to itself. This transmission is monitored via the monitoring apparatus 15 without feedback.

The monitored data transmission is transmitted by the monitoring apparatus 15 to the receiver unit. The transmission of the file can occur in a message. In general, it is also possible for the transmission to take place in fragments, that is to say pieces. The receiver apparatus 13 then has to assemble the fragments. The file 42 can comprise one or more checksums, which are formed, for example as a digital signature, by means of CRC. The file 42 can be redundantly encoded so that transmission errors can be corrected. Error correction methods can also be used for this purpose, such as are known e.g. for http transmission.

All the features which are described and/or characterized can advantageously be combined with one another within the scope of embodiments of the invention. The invention is not restricted to the exemplary embodiments described.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A one-way coupling device for feedback-free transmission of data from a first network with high security requirements into a second network with low security requirements, comprising at least one processor and a memory device, the at least one processor configured to provide: a request apparatus; a monitoring apparatus; and a receiver apparatus; wherein the request apparatus is designed to make available a first communication connection within the first network to at least one device, and to request first data from the at least one device via the first communication connection, and subsequently to transmit the first data via a second communication connection on a separate line loop from an interrogation interface of the request apparatus directly to an input interface of the request apparatus, wherein the separate line loop is contained only within the first network; wherein the monitoring apparatus is designed to monitor data on the separate line loop and to transfer the data to the receiver apparatus arranged in the second network to ensure a one-way transmission of data from the first network to the second network;
   wherein the request apparatus has a first protocol unit for making available a first communication protocol for the first communication connection to the at least one device; and
   wherein the request apparatus has a second protocol unit for making available a second communication protocol for transmitting the first data via the separate line loop.

2. The one-way coupling system as claimed in claim 1, wherein the first communication protocol being the Open Platform Communication Unified Architecture (OPC UA) protocol.

3. The one-way coupling system as claimed in claim 1, wherein the request apparatus has a conversion unit for converting a format for the first data.

4. The one-way coupling system as claimed in claim 1, wherein the request apparatus has a memory unit for storing the first data.

5. The one-way coupling system as claimed in claim 1, wherein the monitoring apparatus is a data copier.

6. A request apparatus for a one-way coupling device for feedback-free transmission of first data from at least one device in a first network, the request apparatus designed to make available a first communication connection within the first network to the at least one device, and to request the first data from the at least one device via the first communication connection, and subsequently to transmit the first data via a second communication connection on a separate line loop, running outside the request apparatus, from an output interface of the request apparatus directly to an input interface of the request apparatus;
   wherein a first communication protocol is used for the first communication connection to the at least one device, and a second communication protocol is used for transmitting the first data via the separate line loop.

7. A method for feedback-free transmission of data from a first network with high security requirements into a second network with low security requirements, the method comprising: providing a first communication connection within the first network; requesting and receiving the first data from at least one device in the first network via the first communication connection; transmitting the first data in a second communication connection via a separate line loop from an output interface of the request apparatus directly to an input interface within the first network, wherein the separate line loop is contained only within the first network; monitoring the first data on the separate line loop to ensure a one-way transmission of data from the first network to the second network; and transferring the first data to a second network with lower security requirements;

wherein a first communication protocol is used for the first communication connection to the at least one device, and a second communication protocol is used for transmitting the first data via the separate line loop.

8. The method as claimed in claim 7, wherein the first communication protocol is an Open Platform Communication Unified Architecture (OPC UA) protocol.

9. The method as claimed in claim 7, wherein a format of the first data is converted in the request apparatus, and/or the first data is stored in a memory unit.

10. The method as claimed in claim 7, wherein the first data is transmitted in encrypted form on the first communication connection and is decrypted before the transmission on the connecting loop.

11. The method as claimed in claim 10, wherein the data is transmitted in unencrypted form on the separate line loop.

12. The method as claimed in claim 10, wherein the data for transmission on the separate line loop is transmitted in encrypted form.

13. The method as claimed in claim 7, wherein the first data is stored in an evaluation database in the second network and is passed on in a retrievable or automatic fashion from the evaluation database to an evaluation apparatus.

14. A computer program product, comprising a computer readable hardware storage device having computer readable program code stored therein, the program code executable by a processor of a computer system to implement a method comprising: providing a first communication connection within the first network; requesting and receiving the first data from at least one device in the first network via the first communication connection; transmitting the first data in a second communication connection via a separate line loop from an output interface of the request apparatus directly to an input interface within the first network, wherein the separate line loop is contained only within the first network; monitoring the first data on the separate line loop to ensure a one-way transmission of data from the first network to a second network; and transferring the first data to the second network with lower security requirements;

wherein a first communication protocol is used for the first communication connection to the at least one device, and a second communication protocol is used for transmitting the first data via the separate line loop.

\* \* \* \* \*